(12) United States Patent
Kawashima

(10) Patent No.: US 6,917,574 B2
(45) Date of Patent: Jul. 12, 2005

(54) DATA RECORDING AND REPRODUCING APPARATUS AND METHOD FOR LINKING DATA USING A DECREASED NUMBER OF DATA LINKING BLOCKS

(75) Inventor: Tetsuji Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 09/833,858

(22) Filed: Apr. 12, 2001

(65) Prior Publication Data

US 2001/0050891 A1 Dec. 13, 2001

(30) Foreign Application Priority Data

Apr. 14, 2000 (JP) ...................................... 2000-118513

(51) Int. Cl.$^7$ .............................................. G11B 5/76
(52) U.S. Cl. .............................. 369/59.26; 369/47.17; 369/53.33; 369/124.08
(58) Field of Search ........................... 369/47.2, 47.15, 369/47.17, 47.28, 53.31, 53.33, 53.34, 59.25, 59.26, 59.27, 124.07, 124.08, 124.09

(56) References Cited

U.S. PATENT DOCUMENTS

| | | | | |
|---|---|---|---|---|
| 5,883,869 A | * | 3/1999 | Tamai et al. ............. | 369/47.32 |
| 5,986,980 A | * | 11/1999 | Takeshita et al. ........ | 369/30.23 |
| 6,134,626 A | * | 10/2000 | Inokuchi et al. ............... | 711/4 |
| 6,587,416 B1 | * | 7/2003 | Tsukihashi ............... | 369/59.14 |

* cited by examiner

*Primary Examiner*—Paul W. Huber
(74) *Attorney, Agent, or Firm*—Frommer Lawrence & Haug LLP; William S. Frommer

(57) ABSTRACT

User data is recorded in a recording medium while being linked in units of a fixed length packet, and information indicative of this fact is written to the recording medium. At the time of reading the user data, the position of data linking block can be detected by making reference to the identification information, whereby the excessive run-out blocks which would be otherwise requisite to detect the position of the data linking block are made unnecessary. At the time of data linking, a part where data in the run-in block is missing is filled with correct data, thus the run-in block can correctly be read, whereby the excessive run-in blocks which would otherwise be requisite are made unnecessary.

17 Claims, 7 Drawing Sheets

FIG.8

DATA RECORDING AND REPRODUCING APPARATUS AND METHOD FOR LINKING DATA USING A DECREASED NUMBER OF DATA LINKING BLOCKS

BACKGROUND OF THE INVENTION

1. Field of the Invention

The present invention relates to a data reproducing method and apparatus for reading data written in a data recording area of a recording medium while linking the data in predetermined units, and to a data recording method and apparatus for writing data to a data recording area of a recoding medium while linking the data in predetermined units.

2. Description of the Related Art

There has become popular a CD (compact disc) system in which an optical disc having an outside diameter of about 120 mm and a thickness of about 1.2 mm is used as a recording medium and a signal is read from, or written to, the optical disc by projecting a light converged by an objective lens onto a signal recording surface of the optical disc.

The CD system has initially been developed as a recording and playback system for digital audio data. As this technology has been accepted very widely, a wide variety of CD systems have so far been proposed for various applications.

Recently, the personal computers have been used as an information processing means in more and more ordinary households. Along with this tendency, a read-only optical disc called "CD-ROM (read-only memory)" has become popular to have recorded therein data handled in the personal computer.

Also, a recordable optical disc such as CD-R (recordable) and rewritable optical disc such as CD-RW (rewritable) have been developed and used in practice as optical discs interchangeable with the CD-ROM.

Data is recorded to the CD-R and CD-RW by the so-called "Track At Once" method by which data is written in units of a track, and the so-called "Packet Writing" method by which data is written in units of a packet which is a smaller unit than the track. When either the "Track At Once" or "Packet Writing" method is used to record data to the CD-R or CD-RW, a plurality of data linking blocks is provided between tracks or between packets, each being a unit in which data is continuously recorded, according to a predetermined linking rule. That is, in case data is recorded by the "Track At Once" method or "Packet Writing" method, it will be written with a plurality of data linking blocks appended at each unit of data which is to be continuously written.

The reason why the plurality of data linking blocks is appended between tracks or packets is that the CD-R and CD-RW adopt a convolution type cross coding method called "CIRC (cross interleave Reed-Solomon code)" and a data discontinuity takes place at a linking position because of the CIRC interleaving. That is, the data linking blocks are provided at a linking position of data as a guard area in which data missing is prevented in linking interleaved data to each other.

The additional or appended data linking blocks are meaningless as user data, and are removed when reading data. Therefore, the number of data linking blocks should desirably be as small as possible.

However, to properly link interleaved data for writing the data, or to positively detect, for reading the data, when such data linking blocks being meaningless as user data are reached or when there exist no more data linking blocks, the CD-R and CD-RW having the current format, for example, need as many as seven data linking blocks (14 kilobytes) for each unit of data to continuously be written, in practice.

Recently, optical discs having a higher recording density than the CD-R and CD-RW having the current format is under development. For a higher ability of burst error correction in such an optical disc having a high recording density, it has been studied to increase the interleaving length in the CIRC interleaving method. However, it is expected that with such an increased interleaving length, the linking of interleaved will influence so widely that an increased number of such data linking blocks will be required.

OBJECT AND SUMMARY OF THE INVENTION

It is therefore an object of the present invention to overcome the above-mentioned drawbacks of the prior art by providing a data reproducing method and apparatus, capable of properly reading data linked to each other by a small number of data linking blocks, and a data recording method and apparatus, capable of properly linking data with a decreased number of data linking blocks.

The above object can be attained by providing a data reproducing method for reading data having been written in a data recording area of a recording medium, the data being interleaved with a data linking block appended at each fixed length packet as a recording unit, and linked at a linking position in the data linking block, the method including, according to the present invention, steps of:

reading the data from the data recording area of the recording medium and de-interleaving the data thus read;

detecting the position of the data linking block by checking that the data is a one having been written in units of the fixed length packet; and generating a reading data by removing the data linking block.

In the above data reproducing method, since the position of the data linking block is detected by checking that the data has been written in units of the fixed length packet, so the data can properly be read even if the number of data linking blocks is set small.

Also the above object can be attained by providing a data player for reading data having been written in a data recording area of a recording medium, the data being interleaved with a data linking block appended at each fixed length packet as a recording unit, and linked at a linking position in the data linking block, the apparatus including according to the present invention:

means for reading the data from the data recording area of the recording medium;

means for de-interleaving the data read from the data recording area of the recording medium; and means removing the data linking block from the de-interleaved data to generate a reading data.

In the above data player, the reading signal generating means detects the position of the data linking block by checking that the data has been written in units of the fixed length packet.

In this data player, the data having been written in the data recording area of the recording medium is read by the data reading means. The data read from the data recording area of the recording medium by the data reading means is supplied to the de-interleaving means where it will be de-interleaved. The data thus de-interleaved is supplied to the reading data generating means where the data linking block will be removed from the supplied de-interleaved data to generate a reading data. The reading data generating means detects the position of the data linking block by checking that the supplied data has been written in units of the fixed length packet, and removes the data linking block to generate the reading data.

Since the reading data generating means detects the position of the data linking block by checking that the supplied data has been written in units of the fixed length packet as in the above, the data player can properly read data even if the number of data linking blocks is set small.

Also the above object can be attained by providing a data recording method for writing data to a data recording area of a recording medium by appending data linking blocks at each unit of data to continuously be written to the data recording area, interleaving the data to which the data linking blocks have been appended and linking the interleaved data at a linking position in the data linking block, the method including, according to the present invention, steps of:

storing one, after the linking position, of the data in the data linking block which will be placed across the linking position due to the interleaving; and linking the interleaved data by appending the stored data to subsequent data.

Since one, after the linking position, of the data in the data linking block which will be placed across the linking position due to the interleaving is stored and the interleaved data is linked by appending the stored data to subsequent data as in the above, this data recording method can effectively prevent data from being missing due to the linking of the interleaved data with a reduced number of data linking blocks.

Also the above object can be attained by providing a data recorder for writing data to a data recording area of a recording medium, including according to the present invention:

means for appending data linking blocks at each unit of data to continuously be written to the data recording area;

means for interleaving the data to which the data linking blocks have been appended; and means for writing the data to the data recording area of the recording medium while linking the interleaved data at a linking position in the data linking block.

In the above data recorder, the data writing means stores one, after the linking position, of the data in the data linking block which will be placed across the linking position due to the interleaving, and links the interleaved data by appending the stored data to subsequent data.

In the data recorder, the data linking block appending means appends the data linking blocks to data to be recorded at each unit of data to continuously be written to the data recording area of the recording medium. The data having the data linking blocks appended thereto by the data linking block appending means is supplied to the interleaving means where it will be interleaved. Then, the data thus interleaved by the interleaving means is supplied to the data writing means, and written to the data recording area of the recording medium by the data writing means while being linked at the linking position in the data linking block. At this time, the data writing means stores one, after the linking position, of the data in the data linking block which will be placed across the linking position due to the interleaving by the interleaving means. To link subsequent data, the data writing means appends to the subsequent data the stored data, that is, one, after the linking position, of the data in the data linking block which will be placed across the linking position due to the interleaving by the interleaving means.

Since the data writing means stores one, after the linking position, of the data in the data linking block which will be placed across the linking position due to the interleaving, and appends the stored data to subsequent data, to thereby link the interleaved data, the data recorder can effectively prevent data from being missing due to the linking of the interleaved data with a reduced number of data linking blocks.

Also the above object can be attained by providing a data recording method for writing data to a data recording area of a recording medium by appending data linking blocks at each unit of data to continuously be written to the data recording area, interleaving the data to which the data linking blocks have been appended and linking the interleaved data at a linking position in the data linking block, the method including, according to the present invention, steps of:

reproducing one, after the linking position, of the data in the data linking block which will be placed across the linking position due to the interleaving; and linking the interleaved data by appending the reproduced data to subsequent data.

Since one, after the linking position, of the data in the data linking block which will be placed across the linking position due to the interleaving is reproduced and the interleaved data is linked by appending the reproduced data to subsequent data as in the above, this data recording method can effectively prevent data from being missing due to the linking of the interleaved data with a reduced number of data linking blocks.

Also the above object can be attained by providing a data recorder for writing data to a data recording area of a recording medium, including according to the present invention:

means for appending data linking blocks at each unit of data to continuously be written to the data recording area;

means for interleaving the data to which the data linking blocks have been appended; and means for writing the data to the data recording area of the recording medium while linking the interleaved data at a linking position in the data linking block.

In the above data recorder, the data writing means reproduces one, after the linking position, of the data in the data linking block which will be placed across the linking position due to the interleaving, and links the interleaved data by appending the reproduced data to subsequent data.

In the data recorder, the data linking block appending means appends the data linking blocks to data to be recorded at each unit of data to continuously be written to the data recording area of the recording medium. The data having the data linking blocks appended thereto by the data linking block appending means is supplied to the interleaving means where it will be interleaved. Then, the data thus interleaved by the interleaving means is supplied to the data writing means, and written to the data recording area of the recording medium by the data writing means while being linked at the linking position in the data linking block. At this time, the data writing means reproduces one, after the linking position, of the data in the data linking block which will be placed across the linking position due to the interleaving by the interleaving means. To link subsequent data, the data writing means appends to the subsequent data the reproduced data, that is, one, after the linking position, of the data in the data linking block which will be placed across the linking position due to the interleaving by the interleaving means.

Since the data writing means reproduces one, after the linking position, of the data in the data linking block which will be placed across the linking position due to the interleaving, and appends the reproduced data to subsequent data, to thereby link the interleaved data, the data recorder can effectively prevent data from being missing due to the linking of the interleaved data with a reduced number of data linking blocks.

These objects and other objects, features and advantages of the present intention will become more apparent from the following detailed description of the preferred embodiments of the present invention of an optical disc drive which writes and/or reads data to and/or from a CD-R (recordable optical disc) when taken in conjunction with the accompanying drawings.

BRIEF DESCRIPTION OF THE DRAWINGS

FIG. 3 shows an example of the data structure in the CD-R in FIG. 1, in which:

FIG. 3A shows the recording area of the CD-R, including a plurality of sessions;

FIG. 3B shows one session including a plurality of tracks;

FIG. 3C shows one track including a plurality of packets; and

FIG. 3D shows one packet including a plurality of data blocks;

FIG. 8 shows a data structure of subcode;

DETAILED DESCRIPTION OF THE PREFERRED EMBODIMENTS

Figure 1:
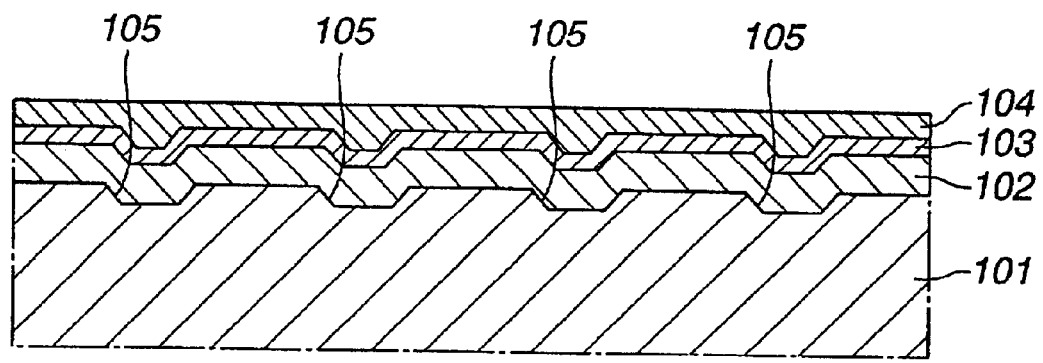
FIG. 1 is a sectional view of the essential portions of a CD-R.

Referring now to FIG. 1, there is schematically illustrated in the form of a sectional view a CD-R to and/or from which data is written and/or read by the optical disc drive according to the present invention.

As shown in FIG. 1, the CD-R includes a disc substrate 101 being a disc of polymethyl methacrylate (PMMA) or polycarbonate (PC), formed to have an outside diameter of 120 mm and thickness of 1.2 mm. The disc substrate 101 has a recording layer 102 formed thereon by spin coating of an organic-dye recording material. The recording layer 102 has formed thereon a reflective layer 103 of gold (Au) or silver (Ag) for example, and the reflective layer 103 has a protective layer 104 formed thereon by spin coating of an ultraviolet-settable resin for example.

In this CD-R, when the recording layer 102 is illuminated with a writing laser light modulated according to data to be written (recording data), an interaction between the recording layer 102 and the disc substrate 101 adjacent to the recording layer 102, within a laser light-illuminated area, will cause a deformation at the boundary between the disc substrate 101 and recording layer 102, whereby a train of pits corresponding to the recording data is irreversibly formed. By illuminating the pit train with a reading laser light and detecting a change of its reflectance, data written to the CD-R can be read.

Figure 2:
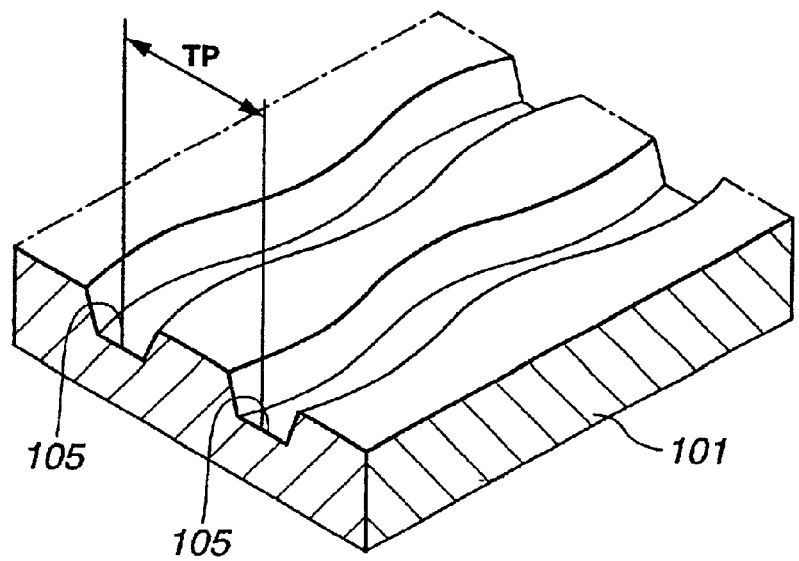
FIG. 2 is a perspective view, enlarged in scale, of a part of a disc substrate of the CD-R in FIG. 1.

As shown in FIGS. 1 and 2, wobbling grooves 105 being wobbling guide grooves are formed spiral for example in a data recording area of the disc substrate 101. Portions of the recording layer 102 corresponding to the wobbling grooves 105 are set as recording tracks along which user data etc. subjected to error-correction coding and EFM modulation will be recorded. Therefore, the interval between the adjacent wobbling grooves 105 is taken as a track pitch TP in this CD-R as shown in FIG. 2.

The wobbling grooves 105 are formed to wobble slightly resembling a sinusoidal wave. Owing to this wobbling, FM modulated positional information, that is, time-base information indicative of an absolute position on the disc, is recorded as an ATIP (absolute time in pregroove) wobble signal.

The ATIP wobble signal is recorded to have a center frequency of 22.05 kHz for example when the CD-R is rotated at a predetermined velocity. One sector of the ATIP wobble signal coincides with one data sector (2352 bytes) of user data, and thus the user data is written to the CD-R while the data sector of the user data is being brought into sync with the sector of the ATIP wobble signal.

A data structure of the CD-R is shown in FIGS. 3A to 3D. The data structure shown in FIGS. 3A to 3D is an example in which data is written in units of a packet to the CD-R by the so-called "Packet Writing" method.

Figure 3:
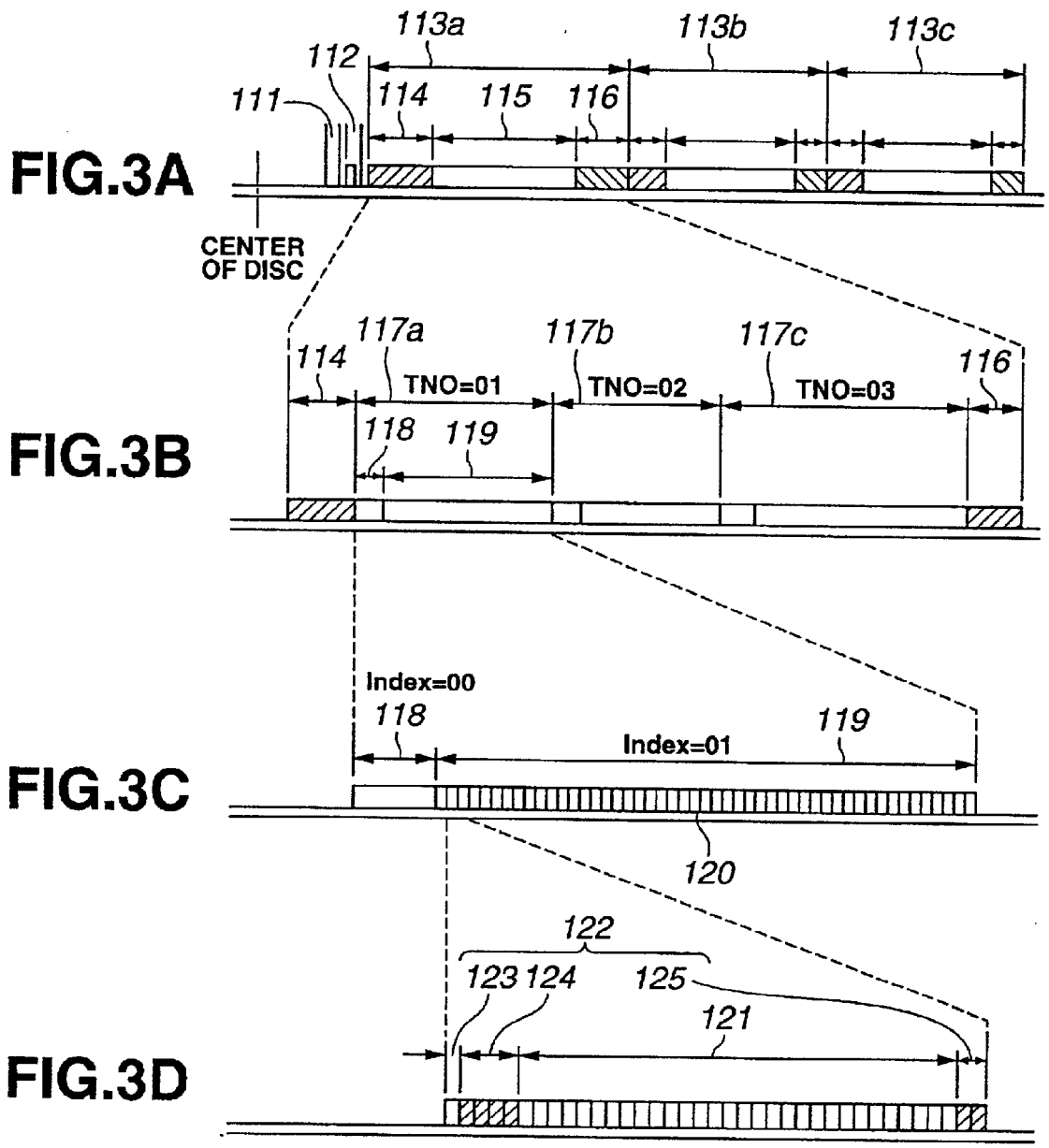

As will be seen from FIG. 3A, the data recording area of the CD-R includes a power calibration area (PCA) 111, program memory area (PMA) 112 and a plurality of sessions 113a, 113b and 113c in this order beginning from the near-center inner circumference of the optical disc.

In the PCA area 111, the writing laser power is calibrated. This area further includes a test area in which a trial write is actually made, and a count area in which the used status of this test area is recorded. In the PMA area 112, information such as a recording data mode, write start and write end positions, etc. are provisionally stored. These PCA and PMA areas 111 and 112 are only needed only at the time of data recording. After completion of the finalization, the optical pickup of the optical disc drive will not access these areas during data reading.

Each of the plurality of sessions 113a, 113b and 113c includes a lead-in area 114, program area 115 and a lead-out area 116 in this order beginning from the inner circumference of the optical disc.

The lead-in area 114 is used to read data written in the program area 115, and will have TOC (table of contents) information or the like written therein. At the time of data reading, the optical pickup can instantly access a desired recording track by reading the TOC information written in the lead-in area 114. The lead-out area 116 will have variety of information on the optical disc recorded therein. The lead-out area 116 of the session area 113c located along the outermost circumference of the optical disc serves as a buffer area to prevent the optical pickup of the optical disc drive from overrunning.

The program area 115 will actually have user data written therein. As shown in FIG. 3B, data tracks discriminated each by a track number "TNO" are recorded in this area correspondingly to the number of data recorded thereto. In the example shown in FIG. 3B, one session includes three data tracks 117a, 117b and 117c.

Each of the data tracks 117a, 117b and 117c to which a corresponding track number "TNO" is assigned includes two areas each having an "Index" as shown in FIG. 3C. An area 118 having an index of "00" will have TD (track descriptor) information which is track information written therein. Also, an area 119 having an index of "01" will have user data in units of a packet 120. That is, user data is continuously written at each packet 120 in the area 119 having the index of "01". Note that when user data is written in units of a packet, either a fixed-length packet method in which one packet has a length fixed to 32 data blocks or a variable-length packet method in which one packet is variable in length. The fixed-length packet method is adopted by way of example herein to write user data.

The packet 120 includes a plurality of data blocks 121. The data block 121 is a mass of data being a unit of access used when the optical disc drive accesses user data in the optical disc, and normally includes 2352 bytes of user data. Note that the data block 121 is also called "data sector".

The packet 120 has appended thereto a plurality of data linking blocks necessary for linking between this packet 120 and an adjacent packet 120. Each of the data linking blocks 122 is provided as a guard area, according to a predetermined linking rule, to prevent user data from being missing at a linking position due to interleaving of the user data. As shown in FIG. 3D, the data linking block 122 includes a linking block 123 appended to the head of the packet 120, a plurality of run-in blocks 124 provided next to the linking block 123, and a plurality of run-out blocks 125 appended to the tail of the packet 120. More specifically, a preceding packet 120 and a packet 120 after the preceding packet 120 will be linked to each other by the plurality of data linking blocks 122 including the run-out block 125 appended to the tail of the preceding packet 120, linking block 123 and the run-in block 124 appended to the head of the trailing packet 120.

Figure 4:
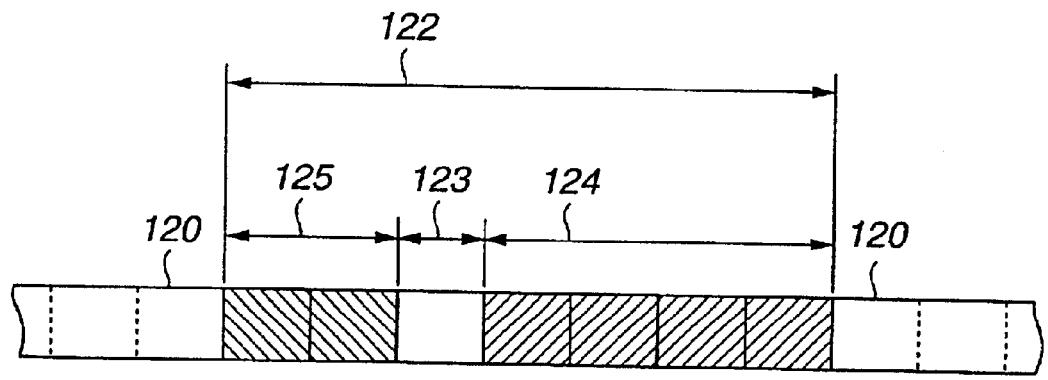
FIG. 4 shows an example of data linking blocks appended to between packets.

FIG. 4 shows an example of the data structure at a position where the packets 120 are linked to each other according to the linking rule adopted in the CD-R having the current format. In this example shown in FIG. 4, two run-out blocks 125 are appended to the tail of the preceding packet 120 and one linking block 123 and four run-in blocks 124 are appended to the head of the trailing packet 120. Therefore, the packets 120 including 32 data blocks 121 for example are linked to each other by seven data linking blocks 122.

The data linking blocks 122 are meaningless as user data and are removed at the time of data reading. According to the linking rule for the CD-R having the current format, the seven data linking blocks are appended to each packet 120 as in the above, and so in case the one packet 120 includes 32 data blocks as in the above, an area as large as about 18% (=7/39) cannot be used for recording of user data. When the number of the data linking blocks 122 is further increased, the proportion of the unusable area for recording the user data will further be larger. Therefore, the number of the data linking blocks 122 should desirably be set as small as possible. Therefore, the number of the data linking blocks 122 should desirably be set as small as possible.

Accordingly, the number of the data linking blocks 122 is set as small as possible in the present invention. Thus, a total of the data linking blocks can be made three, namely, the data linking blocks may include one link block 123, one run-in block 124 and one run-out block 125. This will further be described later.

Next, the format of data recorded to the CD-R will be described herebelow. User data recorded to the CD-R is subjected to convolution type cross error-correction coding, called "CIRC (cross interleave Reed-Solomon code)", and also to EFM (eight to fourteen modulation) before being written to the optical disc.

In the CIRC error-correction coding, data is coded with a Reed-Solomon code (C2 code) at each data unit of 24 bytes (12 words) and a 4-byte parity (Q parity) is appended to the coded data. User data and Q parity, of 28 bytes in total, are interleaved, and then subjected to coding by a Reed-Solomon code (C1 code), and further a 4-byte parity (P parity) is appended to the coded data, thereby providing a total of 32 bytes of data.

Figure 5:
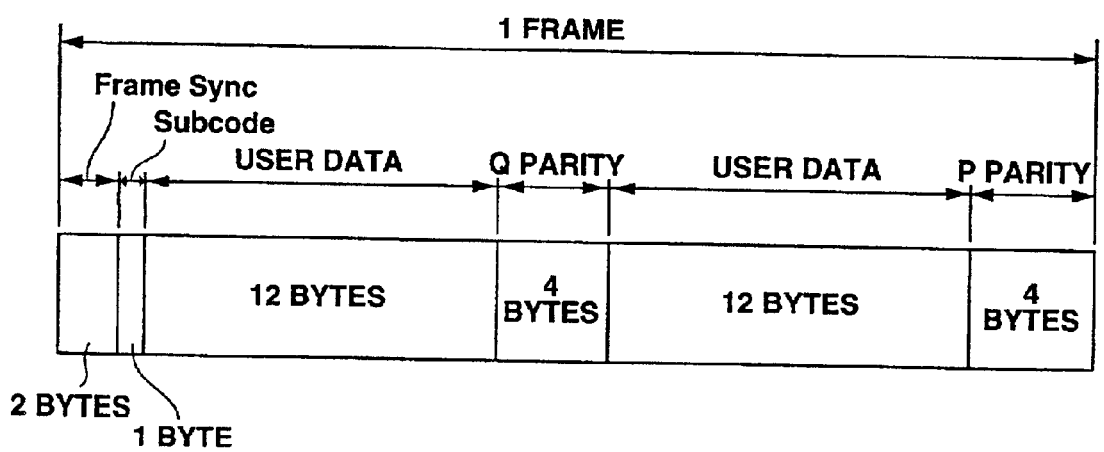
FIG. 5 shows a frame structure of data to be recorded to the CD-R in FIG. 1.

As in the above, the 4-byte Q parity and 4-bytes P parity are appended to each user data of 24 bytes by the CIRC error-correction coding to provide the 32 bytes of data. A 2-byte frame sync signal "Frame Sync" and 1-byte subcode "Subcode" are appended to the 32 bytes of data to form one frame which is a data transmission unit, as shown in FIG. 5.

Figure 6:
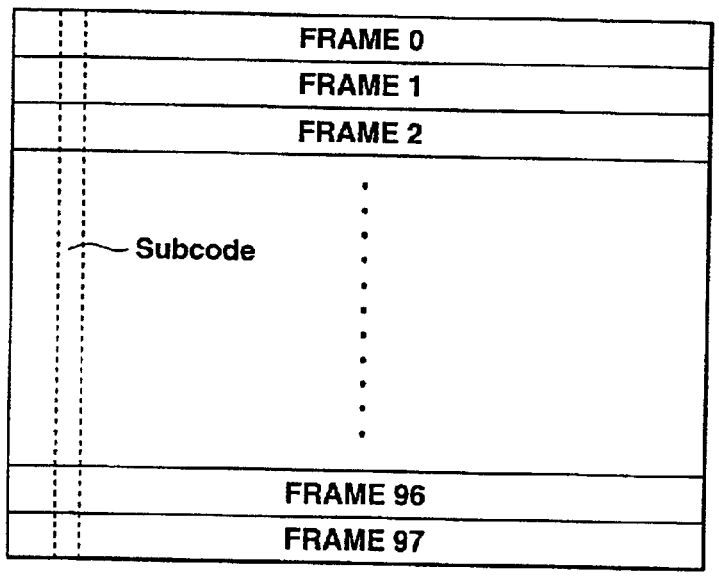
FIG. 6 shows a data block structure of data to be recorded to the CD-R in FIG. 1.

The above subcode "Subcode" includes eight channels P to W, and one bit for each channel (one byte in total) is inserted in each frame. Subcodes in a total of 98 frames will complete a piece of data. As shown in FIG. 6, a data block (data sector) being a unit of access in which th optical disc drive will access the subcode is composed of the 98 frames of which the subcodes complete one data unit.

Figure 7:
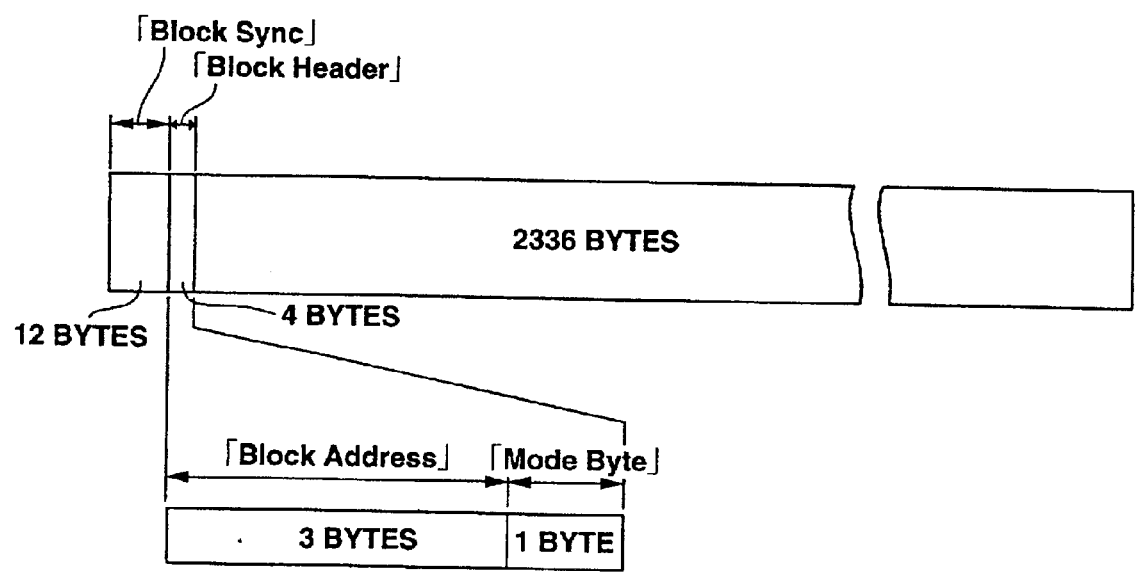
FIG. 7 shows a data structure of user data.

User data included in one data block is of 2352 bytes (24 bytes by 98) in total, and it includes, at the head thereof, 12 bytes of block sync signal "Block Sync" and 4 bytes of "Block Header" as shown in FIG. 7. In the "Block Header", 3 bytes thereof is assigned as a "Block Address", and the rest (1 byte) is assigned as a "Mode Byte" which indicates the attribute of the block.

Figure 8:
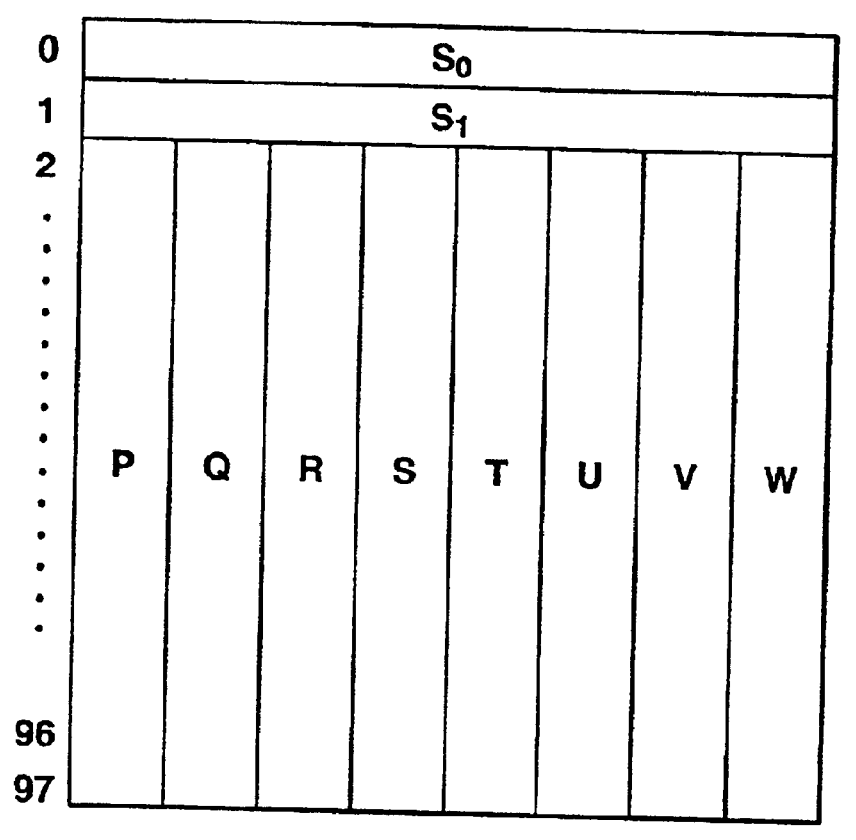

Also, the subcodes included in one data block are a total of 98 bytes of data of which the first 2 bytes are assigned to a subcode sync signal "$S_0$, $S_1$" as shown in FIG. 8. The remaining 96 bytes are assigned to channels P to W. Of these channels, the channels P and Q are used for access to a data block to which the subcodes belong, and the channels R to W are used to record incidental data.

For example 32 data blocks in the data organized as in the above are used as one packet 120, and the data will be written in units of the packet 120 to the CD-R by means of the data linking blocks 122.

Data will be subjected to the CIRC interleaving as in the above before being written to the CD-R. The CIRC interleaving is to impart a delay of 0, D, 2D, ..., 27D to a total of 28 bytes of data, respectively, to which 4 bytes of Q parity has been appended. The "D" is a delay parameter used in the CIRC interleaving and set to 4 (frames) for data write and/or read to a CD-R having the current format. Therefore, data subjected to the CIRC interleaving and then written to the CD-R will be delayed a maximum of 108 (=27×4) frames.

To properly write, to the data recording area of the CD-R, data delayed a maximum of 108 frames for example due to the CIRC interleaving by linking the data so that the user data will not be missing, data to be written in units of a packet have a data linking block 122 appended to each packet 120 thereof according to a predetermined linking rule as in the above.

The linking rule applied to the CD-R having the current format will be described herebelow. According to that linking rule applied to the CD-R having the current format, data should be linked at a position of 26 EFM frames from the leading edge of a subcode sync signal "$S_0$, $S_1$" of a link block. The EFM frame is a unit of data transmission and the same as the frames forming together the aforementioned data block. The reason why the data linking position is not determined with reference to the leading edge of the block sync signal "Block Sync" but to the leading edge of the subcode sync signal "$S_0$, $S_1$" is that since the block sync signal "Block Sync" is also interleaved, it cannot be read after being interleaved. Note that the data linking position is allowed to have a shift of ±4 EFM frames but the linking rule will be described on the assumption that there is not such a shift of the data linking position, for the simplicity of explanation.

According to the linking rule applied in the CD-R having the current format, two run-out blocks are to be written at the tail of a preceding data, data write has to be stopped at the above-mentioned linking position in a linking block after the data, the data write has to be restarted at the above linking position in the linking block, and subsequent user data have to be written after four run-in blocks are written. Note that according to the linking rule, it is allowed that there is a shift of +36/10 EFM blocks between the leading edge of the block sync signal "Block Sync" for restarting the data write (before data coding using a minimum delay encoder) and that of the subcode sync signal "$S0$, $S1$" included in the data block. However, the linking rule will be described on the assumption that there is no such shift between the leading edge of the block sync signal "Block Sync" and that of the subcode sync signal "$S0$, $S1$". The "minimum delay encoder" means an encoder does not have any circuit delay other than the intentional delay by the interleaving.

According to the aforementioned linking rule, two run-out blocks will be provided at the tail of a preceding data and one linking block and four run-in blocks be provided at the head of a trailing data, when the data area linked to each other. Thus, the user data will be linked by means of these seven data linking blocks.

As many as seven data linking blocks are required for linking data in order to prevent user data from being missing at the linking position due to the CIRC interleaving and positively detect the position of the data linking block at the time of data reading. That is, as having previously been described, since the data linking blocks are meaningly as user data, it is necessary that at the time of data reading, the position of the data linking block should positively be detected and the data linking blocks be removed from a series of data read from the CD-R, to generate reading data.

To positively detect the position of the data linking block, a block to be read should be judged to be a data linking block. That is, if the data linking block can correctly be read, it can be removed from the series of data to generate reading data properly.

Figure 9:
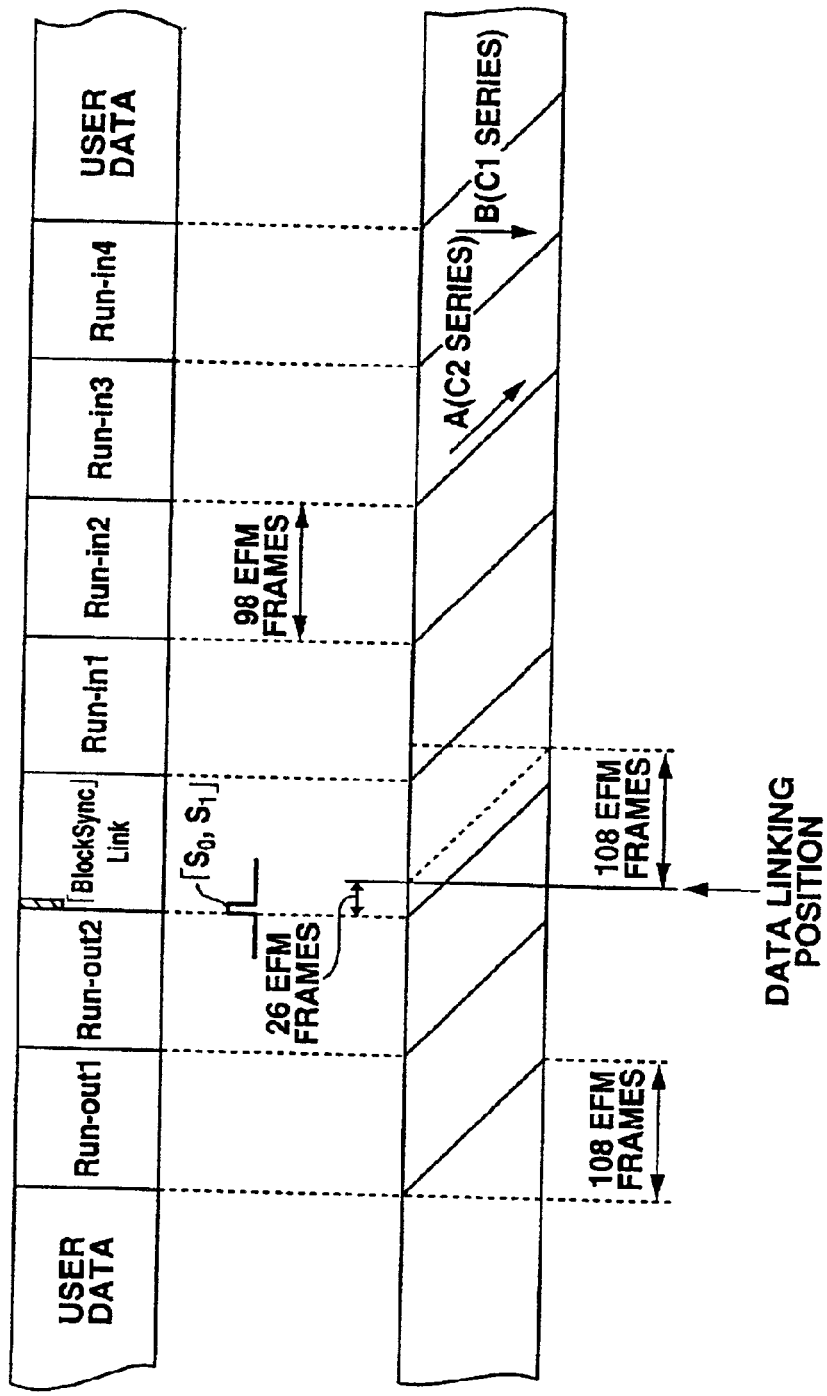
FIG. 9 is a schematic view of linkage of data interleaved with a maximum delay of 108 EFM frames, showing a data linkage made at a position 26 EFM frames after the leading edge of a block sync signal "Block Sync"

Data linkage effected according to the aforementioned linking rule in a CD-R having the current format will be described below with reference to FIG. 9. Note that in FIG. 9, data status before being subjected to the CIRC interleaving is shown in the upper portion of each of the drawings while data status after being interleaved with a delay parameter D of 4 (frames) is shown in the lower portion. Also, in the data after being so interleaved, shown in the lower portion in FIG. 9, data series to be subjected to error correction by the C2 code is shown obliquely in the direction of arrow A while data series to be subjected to error correction by the C1 code is shown vertically in the direction of arrow B. In FIG. 9, there is schematically shown a data linkage made at a position 26 EFM frames after the leading edge of the subcode sync signal "$S_0$, $S_1$" under the assumption that the leading edge of the block sync signal "Block Sync" used for restarting the data writing coincides with that of the subcode sync signal "$S_0$, $S_1$" included in the data block.

Data interleaved with a delay parameter D of 4 (frames) will have a delay of 108 EFM frames at the maximum as having been described above. When the data is linked at a position 26 EFM frames from the leading edge of the subcode sync signal "$S_0$, $S_1$", the latter half of the second run-out block in the data before stop of write (will be referred to as "post-write stop" hereunder) will be after the linking position, so data in this range will be missing. Thus, the second run-out block will not correctly be read. However, since all the first run-out blocks precede the linking position, they can correctly be read. Of course, since the post-write stop user data precedes the first run-out block, it can correctly be read.

On the other hand, in the data after the data writing is restarted (will be referred to as "post-write restart" hereunder), since data included within a range of up to 108-th EFM frame from the linking position include one having been interleaved before and also after the write stop position, it will not be able to correctly be read, and so the first run-in block will not be able to correctly be read. However, the second and subsequent run-in blocks can correctly be read. Of course, the post-write restart user data can correctly be read since they are after the fourth run-in block.

As in the above, the linking rule is such that when linking data having been interleaved with the delay parameter D of 4 and maximum delay of 108 EFM frames, the user data can of course be read correctly, and at least one run-out block and one run-in block can correctly be read. Also, a number of run-in blocks, possibly larger than really required, are provided so that positive re-synchronization therewith is assured when reading the post-write restart data.

Since each of the data linking blocks are a data block to which no user data is written, namely, a data block which is meaningless as user data, the optical disc drive has to positively detect the position of the data linking block meaningless as user data, remove the data linking blocks from a series of data read from the CD-R and generate reading data.

If at least one run-out block can correctly be read and a "Mode Byte" in a "Block Header" of the rub-out block be detected, since the "Mode Byte" include information indicative of the attribute of the block as in the above, the block can be judged to be a run-out block, namely, it will be detected that the optical disc drive has reached the data linking block.

In the example shown in FIG. 9, the second run-out block will not correctly be read and no "Mode Byte" can be detected from the second run-out block. However, since the first run-out block is correctly read, the optical disc drive can detect, by detecting the "Mode Byte" in the first run-out block, when it has reached the data linking block.

Also, if at least one run-in block can correctly be read and the "Mode Byte" in the "Block Header" of the run-in block can be detected, the block can be judged to be a run-in block and it can be detected that there are no more data linking blocks.

In the example shown in FIG. 9, the first run-in block will not correctly be read and no "Mode Byte" can be detected from the first run-in block. However, since the second and subsequent run-in blocks are read correctly, the optical disc drive can detect, by detecting the "Mode Byte" in any of the second and subsequent run-in blocks, when there are no more data linking blocks.

As in the above, if the optical disc drive can detect, at the time of data reading, when it has reached a data linking block and when there are no more data linking blocks, it will be able to positively detect the position of the data linking block, remove the data linking block from the series of data read from the CD-R, and generate reading data.

However, since the data linking block is meaningless as user data, the number of data linking blocks should desirably be as small as possible.

In the example shown in FIG. 9, to prevent any missing user data whose writing has not yet been stopped, only the second run-out block should be provided, and the first run-out block is provided to make it possible to detect when the optical disc drive has reached the data linking blocks. Therefore, if it is possible to detect, without reading the first run-out block, when the optical disc drive has reached the data linking block, the first run-out block will be unnecessary and thus the number of data linking blocks can be reduced.

According to the present invention, the number of run-out blocks is reduced by appending a data linking block to each predetermined amount of user data to make it possible to predict the position of the data linking block. That is, if the amount of user data to which the data linking block is appended is set constant, the position of the data linking block can be predicted by reading data while monitoring the "Block Address" in the "Block Header" in the user data block. Therefore, the first run-out block in the example shown in FIG. 9 is unnecessary and thus only one run-out block may be used as the data linking block.

More specifically, in case data is written in units of a fixed-length packet having a length of for example 32 data blocks in the "Packet Writing" in which data is written in units of a packet, a data linking block is appended at every 32 data blocks of user address. Therefore, by detecting the position of the thirty-second user data block in each packet while monitoring the "Block Address" in each user data block, it will be known that the thirty-second user data block is followed by a data linking block and thus it can positively be detected when the data linking block is reached.

In this case, it is necessary to determine that the user data has been written in units of the fixed-length packet. Such a determination is possible by writing, in the data recording area of the CD-R, identification information for determining that user data has been written in units of the fixed-length packet and reading the identification information at the time of data reading. Note that also information indicative of the length of the fixed-length packet (for example, 32 data blocks) should desirably be included in such identification information.

For example, in case data is written in units of a fixed-length packet in all the data recording area of the CD-R, such identification information may be written in the CD-R as an ATIP wobble signal from a wobbling groove 105 formed in the lead-in area 114 of the session 113a located along the innermost disc circumference as shown in FIG. 3A for example. That is, the ATIP wobble signal from the wobbling groove 105 provided in the lead-in area 114 includes "Special Information" indicative of incidental information in addition to time-base information indicative of an absolution position on the optical disc. A frame assigned as the "Special Information" has a "reserved" part. The identification information for determining that user data has been written in units of the fixed-length packet may be included in the "reserved" part.

Also, in case data is written in units of a fixed-length packet in all the data recording area of the CD-R, identification information for determining that user data has been written in units of the fixed-length packet may be included in a Q channel of a subcode written to the PMA 112. In the Q channel of the subcode written to the PMA 112, there is defined an item indicative of a disc ID. Since the item indicating the disc ID includes a "reserved" part, the identification information for determining that the user data has been written in units of the fixed-length packet can be included in the "reserved" part.

In case data is written in units of a fixed-length packet to one entire session in the data recording area of the CD-R, identification information indicating that user data has been written in units of the fixed-length packet can be included in the Q channel of a subcode written to the lead-in area 114 of the session. That is, since an item indicating TOC information is defined in the Q channel of the subcode written to the lead-in area 114 and the item indicating the TOC information has a part indicating a recording format of the session, the identification information indicating that the user data has been written in units of the fixed-length packet can be included in that part.

Also, in case data is written in units of a fixed-length packet to one data track of the program area 115 of one session, identification information indicating that user data has been written in units of the fixed-length packet can be included as TD (track descriptor) written to the area 118 of the data track, having an index "Index" "00".

By writing, to the data recording area of the CD-R in advance, the identification information indicating that the user data has been written in units of the fixed-length packet and reading the identification information at the time of data reading, it is possible to determine that the user data has been written in units of the fixed-length packet and predict the position of the data linking block on the basis of the result of the determination. Therefore, the run-out block requisite to detect the position of the data linking block is unnecessary and thus the number of data linking blocks can be reduced correspondingly.

On the other hand, since 108 EFM frames of data, from the linking position, of the post-write restart include those having been interleaved before the data writing has been stopped, the error correction by the C2 code series cannot correctly be done and thus the data cannot correctly be read.

Also, the error correction by the C1 code series of the former half of the data cannot correctly be done and thus the data cannot correctly be read. More particularly, to link the interleaved data, only data blocks including those which will be before the linking position after the interleaving are written to the CD-R. That is, in the example shown in FIG. 9, 26 EFM frames of data from the top of a link block are interleaved as those before data write is stopped (will be referred to as "pre-write stop data" hereunder), and deployed in the buffer memory. Of the data interleaved and deployed in the buffer memory, only those before the linking position are written to the CD-R. Next, interleaved data blocks completely after the linking position, namely, data 26 EFM frames after the link block are interleaved and stored, as post-write restart data, into the buffer memory, in the example shown in FIG. 9.

At this time, the data, interleaved as that before the write stop and deployed in the buffer memory and which actually be after the linking position due to the interleaving, will correspond to a former half of the data after restarting of the data writing. Since the data has been processed as pre-write stop data, it will not be handled as post-write stop data and thus the former half will be missing. Therefore, the latter half of the post-write restart data interleaved and deployed in the buffer memory has a part where on data exists (filled with "0" data in practice). When such post-write stop data is written to the CD-R and linked, the C1 series including the part having no data cannot correctly be subjected to error correction at the time of reading the data after the restart of data writing, and cannot correctly be read. More specifically, in the example shown in FIG. 9, since up to the first run-in block includes many parts having not data as the C1 series, the first run-in block will not be able to correctly be read.

According to the above-mentioned linking rule taking the above in consideration, four run-in blocks are provided so that even if the first run-in block cannot correctly be read when the data having been interleaved with a delay parameter D of "4" and a maximum delay of as long as 108 EFM frames, correct reading of the second and subsequent run-in blocks makes it possible to detect when there are no more data linking blocks and permits a positive re-synchronization is possible at the data reading after the data writing is restarted.

In the example shown in FIG. 9, correct reading of the first run-in block makes it possible to reduce the number of run-in blocks. According to the above linking rule, at least four run-in blocks are provided a for positive re-synchronization at the time of reading post-write restart data. Actually, however, it has been known that the reliability of read data is maintained very high through a strong error correction and so, if a run-in block just before the user data can correctly be read, almost positive re-synchronization is possible. According to the present invention, such an arrangement is made that by correctly reading the first run-in block, the second and subsequent run-in blocks in the example shown in FIG. 9 are made unnecessary and the number of run-in blocks is reduced to one.

To correctly read the first run-in block, the part having no data should be filled with correct data when the post-write restart data is deployed in the buffer memory, and the full after the restart of data writing be written to the CD-R and linked. The "correct" data refers to a one interleaved as the pre-write stop data and deployed in the buffer memory but which is actually after the linking position due to the interleaving. Therefore, to fill a part having no data with correct data, for example, pre-write stop data deployed in the buffer memory, should be stored, have the stored pre-write stop data appended thereto when the post-write restart data is deployed in the buffer memory, to provide a series of data, and the series of data be written to the CD-R.

More particularly, the pre-write stop data deployed in the buffer memory should be left in the buffer memory also after the data writing is stopped, the post-write restart should be deployed in the buffer memory in which the pre-write stop data has already been deployed, the data across the linking position is prevented from being missing to provide a series of data, and only the data after the linking position is written to the CD-R and linked.

By preventing the post-write restart data from being missing and linking the data, one run-in block provided can correctly be read. Namely, the number of run-in blocks can be limited to one.

In the above example, since pre-write stop data deployed in the buffer memory has to be left in the buffer memory also after the data writing is stopped, the above method cannot be applied in case the buffer memory has to be updated after the data writing is stopped and before it is restarted. For example, in case data is to be recorded to any other disc before the data writing is stopped and before it is restarted, the above method cannot be applied because the pre-write stop data cannot be left in the buffer memory.

To fill the part having no data with correct data when the post-write restart data is deployed, the pre-write stop data interleaved and deployed in the buffer memory but which will actually be after the linking position due to the interleaving may be re-generated when the post-write restart data is deployed in the buffer memory, and the re-generated data may be appended to the post-write restart data deployed in the buffer memory.

In the current standard, it is defined that the data linking blocks should include only the "Block Address" of the data linking blocks, "Mode Byte", and "Recorder ID" indicating the type of a recorder in which the data linking blocks have been written as necessary. That is, meaningful ones of the data linking blocks are only the "Block Address", "Mode Byte" and "Recorder ID". If these can be re-generated, the data in the data linking blocks can be re-generated.

Of these data, the "Block Address" and "Mode Byte" can easily be re-generated after the data writing is restarted, even if they have been processed as pre-write stop data. That is, since the "Block Address" can be determined by counting down from the "Block Address" of the trailing data block and the type of data linking blocks which will miss data is always the same, namely; for example in the example shown in FIG. 9, the second run-out block will always miss data, it suffices to always generate a "Mode Byte" corresponding to the type of data linking block.

The "Recorder ID" should be re-generated by reading once data in the data linking block before the data writing is stopped and whose data is not missing and re-generating the same data as the data thus read after the data writing is restarted. However, in case the number of run-out blocks is minimized as in the above, the "Recorder ID" cannot be read from data linking block before the data writing is stopped (will be referred to as "pre-write stop data lining block" hereunder), in some cases.

Also, the "Recorder ID" may not be included in the data in the data linking blocks (run-out block and linking block) processed as pre-write stop data. Since the "Recorder ID" is optionally written as necessary, it may be defined that the "Recorder ID" should be included only in the data in the data linking block (run-in block) processed as post-write restart data. In this case, it is only the "Block Address" and "Mode Byte" that have to be re-generated, and thus they can easily be re-generated.

The data re-generated as in the above is interleaved along with the post-write restart data for example and deployed in the buffer memory. Thus, a full series of data across the linking position will be deployed in the buffer memory. By writing only the data after the linking position to the CD-R data and linking it, the first and subsequent run-in blocks can correctly be read and the number of run-in blocks can be limited to one.

As having been described in the foregoing, according to the present invention, pre-write stop user data is written in units of a fixed-length packet and identification information for determining that the user data has been written in units of the fixed-length packet is read to predict the position of a data linking block, thereby reducing the number of run-out blocks to one for example. Also, by storing or re-generating data in the data linking block, which will be across the linking position due to the interleaving and which will be missing as post-write restart data, and appending the stored or re-generated data to data to be processed as post-write restart data, in order to prevent data from being missing, the number of run-in blocks is reduced to one for example. Therefore, by using the above methods in combination, the number of data linking blocks can be reduced to a minimum of three: one link block, one run-in block and one run-out block. Thus, the number of data linking blocks being meaningless as user data can considerably be reduced and user data can be recorded more for the recording capacity corresponding to the reduction of the number of data linking blocks, whereby user data can efficiently be recorded.

Figure 10:
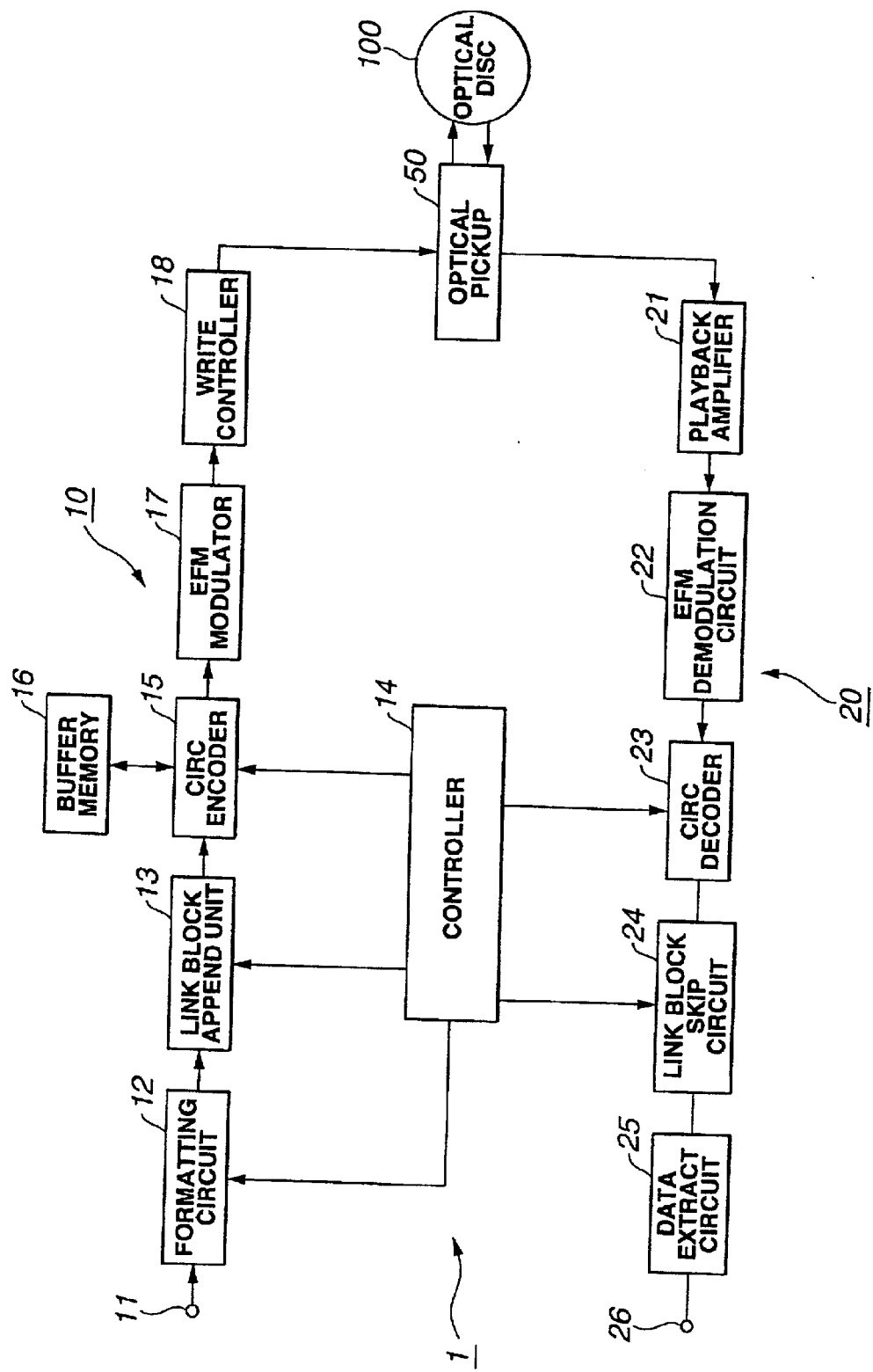
FIG. 10 is a block diagram of the optical disc drive according to the present invention, showing an example construction of the optical disc drive.

Next, the optical disc drive according to the present invention will be described in detail below. FIG. 10 shows an example construction of the optical disc drive. In FIG. 10, the optical disc drive is generally indicated with a reference 1. This optical disc drive 1 is constructed to write and/or read data to and/or from a recordable optical disc (CD-R). It writes data to the CD-R while linking it in units of a fixed-length packet and reads data having been written to the CD-R in units of the fixed-length packet to the reading signal.

As shown, the optical disc drive 1 includes a data recording system generally indicated with a reference 10 and which records data supplied to a host computer or the like to a CD-R 100, and a data playback or reading system generally indicated with a reference 20 and which reads data recorded in the CD-R 100 and supplies the read data to the host computer or the like.

The data recording system 10 has an input terminal 11 to which data (user data) from the host computer or the like is supplied. The user data supplied at the input terminal 11 is first supplied to a formatting circuit 12.

The formatting circuit 12 blocks and packetizes user data supplied from the input terminal 11 according to a predetermined format. One data block include for example 2352 bytes of user data, and one packet includes for example 32 data blocks. The packet is a minimum unit of data to be continuously written to the CD-R and data will not be written to the CD-R in any unit smaller than the packet. Note that in the "Packet Writing" in which data is written in units of a packet, data can be written by a variable-length packet method in which the number of data blocks included in one packet is variable. However, the optical disc drive 1 according to the present invention is so designed that data is written by the fixed-length packet method in which data is written the number of data blocks included one packet is fixed. Therefore, a formatting circuit 12 provided in the optical disc drive 1 packetizes user data supplied from an input terminal 11 thereof at every 32 data blocks for example. Also the formatting circuit 12 generates identification information for determining that user data is written in units of a fixed-length packet, and embeds the identification information in a series of data.

The user data blocked and packetized by the formatting circuit 12 is supplied to a linking block appending unit 13. Under the control of a controller 14 also provided in the optical disc drive 1, the linking block appending unit 13 appends a data linking block necessary for linking of data to each packet of the user data supplied from the formatting circuit 12. More specifically, the linking block appending unit 13 appends one linking block and one run-in block to the head of each packet for example while appending one run-out block to the tail of each packet. Then the data having thus appended to each packet thereof a total of three data linking blocks is supplied to a CIRC encoder 15 also provided in the optical disc drive 1.

As shown in FIG. 10, the CIRC encoder 15 includes a C2 encoder, interleaver and a C1 encoder. The CIRC encoder 15 makes CIRC (cross interleave Reed-Solomon Code) error correction coding of the data supplied from the linking block appending unit 13 under the control of the controller 14.

The data supplied from the linking block appending circuit 13 is first supplied to the C2 encoder. This C2 encoder makes a Reed-Solomon coding (C2 code) of the supplied data at each data unit of 24 bytes (12 words) and appends 4 bytes of parity (Q parity) to the coded data. Thus, a total of 28 bytes of user data and 4-byte parity (Q parity) are supplied to the interleaver where the data will be interleaved.

The interleaver has a delay parameter D of "4" (frames) set therein and will be selected for data write to the normal-density CD-R. When the interleaver is supplied with the data having the Q parity appended thereto, it interleaves the data with a maximum delay of 108 frames (27×4 frames) for example.

The data having thus been interleaved is supplied to the C1 encoder. The C1 encoder makes a Reed-Solomon coding (C1 code) of the data having the Q parity appended thereto at each data unit of 28 bytes and further appends 4 bytes of parity (P parity) to the coded data.

The data thus subjected to the CIRC error correction is deployed in a buffer memory 16 and then supplied to an EFM modulation circuit 17 where it will be subjected to EFM modulation (eight to fourteen modulation). The data thus EFM-modulated is supplied to a write controller 18.

The write controller 18 generates a recording signal corresponding to data going to be written to the CD-R 100 under the control of the controller 14, and supplies the recording signal to an optical pickup 50.

Based on the recording signal supplied from the write controller 18, the optical pickup 50 forms, in the recording area of the CD-R 100, a pit (mark) row corresponding to data to be written. Thus, the user data and a variety of information including identification information supplied from the host-side computer or the like will be recorded to the CD-R.

To link data, the controller 14 controls the operation of each component of the optical disc drive 1 so that data before the linking position at a stage before the interleaving is processed as the pre-write stop data. That is, the data before the linking position before the interleaving will be interleaved by the interleaver in the CIRC encoder 15 and deployed in a buffer memory 16 connected to the CIRC encoder 15. Only the one of the series of data deployed in the buffer memory 16, which actually lies before the linking position, is supplied to the EFM modulation circuit 17 where it is EFM modulated, and converted to a recording signal by the write controller 18 and supplied to the optical pickup 50. Thus, the data before the linking position in practice will be written to the data recording area of the CD-R 100.

To restart the data writing after it is stopped once, the controller 14 controls the operation of each component of the optical disc drive 1 so that the data after the linking position at a step before the interleaving is processed as the post-write restart data. At this time, in the former half of the post-write restart, there will be missing the data which will lie after the linking position due to the interleaving. The controller 14 controls the operation of each component of the optical disc drive 1 so that the part having no data can be filled with correct data.

More specifically, the controller 14 reserves the pre-write stop data deployed in the buffer memory 16 in the buffer memory 16 until the data writing is restarted. When the post-write restart data is interleaved by the interleaver in the CIRC encoder 15 and deployed in the buffer memory 16, it has the reserved post-write stop data appended thereto, and deployed as a series of data in the buffer memory 16. Of the series of data deployed in the buffer memory 16, only the data after the linking position is supplied to the EFM modulation circuit 17 where it will be EFM-modulated. The EFM-modulated data is converted by the write controller 18 to a recording signal which will be supplied to the optical pickup 50. Thus, the data after the linking position will be written to the data recording area of the CD-R 100 without any missing data.

Note that to fill a part having no missing data with correct data when the post-write restart data is deployed in the buffer memory 16, the controller 14 may control the operation of each component of the optical disc drive 1 to re-generate the missing data, that is, data having been processed as the post-write stop data after the linking position, when the post-write restart data is deployed in the buffer memory 16, and to append the re-generated data to the post-write restart data deployed in the buffer memory 16.

In the optical disc drive 1 according to the present invention, since the data after the linking position is written to the data recording area of the CD-R for no data to be missing when linking data, a proper data linkage is possible even if the number of run-in blocks included in the data linking blocks is limited to one. Therefore, by recording data to the CD-R 100 with the optical disc drive 1 according to the present invention, it is possible to efficiently record user data.

On the other hand, in the data playback system 20, a signal recorded as a pit (mark) row in the CD-R 100 is read by the optical pickup 50 and supplied to a playback amplifier 21. On the basis of the signal (a voltage signal resulted from a photoelectric conversion) supplied from the optical pickup 50, the playback amplifier 21 produces a reading signal (RF signal), focus error signal, tracking error signal, etc.

The reading signal produced by the playback amplifier 21 is converted to digital data by a binarization circuit, clock extraction circuit and the like (not shown), and supplied to an EFM demodulation circuit 22. Also, the focus error signal and tracking error signal produced by the playback amplifier 21 are supplied to a servo controller (not shown). The servo controller will provide focus and tracking servo control of the optical pickup 50 on the basis of these focus and tracking error signals.

The digital data (reading data) supplied to the EFM demodulation circuit 22 is EFM-demodulated in the circuit 22 and then supplied to a CIRC decoder 23.

The CIRC decoder 23 is provided correspondingly to the CIRC encoder 15 in the data recording system 10. It includes a C1 decoder, de-interleaver, and a C2 decoder. Under the control of the controller 14, the CIRC decoder 23 makes a CIRC error correction of the reading data supplied from the EFM demodulation circuit 22.

The reading data from the EFM demodulation circuit 22 is first supplied to the C1 decoder where it is subjected to error correction with C1 code. Mainly random errors being small errors will be corrected by the C1 code error correction. The reading data having been error-corrected with the C1 code by the C1 decoder is supplied to the de-interleaver which will de-interleave the reading data.

The de-interleaver has a delay parameter D set to "4" (frames) for example. When the de-interleaver is supplied with data having Q parity appended thereto, it de-interleaves the data with a maximum delay of 108 frames (27×4 frames) for example.

The reading data thus de-interleaved by the de-interleaver is supplied to the C2 decoder. The C2 decoder makes error correction of the de-interleaved reading data with the C2 code. Main a burst error being a large error will be corrected by the error correction with the C2 code. The reading data having been subjected to the error correction with the C2 code in the C2 decoder will be supplied to a linking block skipping circuit 24.

Under the control of the controller 14, the linking block skipping circuit 24 removes the data linking blocks from the reading data having been error-corrected by the CIRC decoder 23. That is, supplied with the reading data from the CIRC decoder 23, the linking block skipping circuit 24 removes one linking block and one run-in block appended to the head of each packet and one run-out block appended to the tail of ac packet.

At this time, the position of data linking block is detected by the controller 14 by reading identification information indicating that user data has been written in units of a fixed-length packet. That is, checking, based on the identification information, that the user data has been written in units of the fixed-length packet, the controller 14 recognizes that the data linking block has been appended to each user data of 32 data blocks for example, and monitors the "Block Address" of a preceding user data block, thereby detecting the position of the data linking block.

Also, of the data linking blocks, the run-in block is written with no missing data in the CD-R 100 so that it can correctly be read. Therefore, the position of the run-in block can be detected by referring to the "Mode Byte" in the run-in block. Thus, the controller 14 can correctly detect the position of the data linking block including from the leading run-out block to the last run-in block of the data linking blocks, and allow the linking block skipping circuit 24 to remove the data linking blocks.

The reading data having the data linking blocks therein removed by the data linking block skipping circuit 24 is supplied to a data extraction circuit 25. The user data extracted by the data extraction circuit 25 is delivered as an output terminal 26, and supplied to the host-side computer or the like.

In the data playback system 20 of the optical disc drive 1 according to the present invention, the identification information written in the CD-R 100 is read to check that user data has been written in units of a fixed-length packet, thereby detecting the position of the data linking block and correctly removing the data linking blocks as in the above. So, even if the number of run-out blocks in the data linking blocks is limited to one, data can properly be read.

In the foregoing, write and read of read to and from the CD-R having the current format have been described by way of example. However, the present invention is not limited to the aforementioned embodiment but is effectively applicable to data write and/or read to and/or from a recording medium having a different format.

For example, a high density CD-R having for example a recording density about double that of the CD-R having the current format has been developed for these years. The present invention can effectively be applied to data write to, and/or read from, to such a high density CD-R. To elevate the ability of correcting a burst error correspondingly to the higher recording density, the delay parameter D in the CIRC interleaving is set to 7 frames. Thus, the interleaving will have an influence on a wider range, and to prevent user data from being missing, two run-out blocks are necessary as the data linking blocks. According to the present invention, however, the number of data linking blocks has not to be increased for detection of the position of data linking block, so a total of four data linking blocks including two run-out blocks and one linking block and one run-in block is only required for appending to the high recording density CD-R.

Also, the present invention is effectively applicable for writing data to a CD-RW which is a rewritable optical disc. The CD-RW is a recording medium in which data is recorded by phase-change recording and its recording format is almost the same as that of the CD-R. Therefore, an optical disc drive constructed similarly to the optical disc drive having been described in the foregoing can support the CD-RW which is a rewritable optical disc. However, since the CD-RW is lower in reflectance than the CD-R, so it is necessary to additionally provide an AGC (automatic gain controller) which can amplify even a weak signal.

As having been described in the foregoing, the present invention can handle data with a reduced number of data linking blocks, so it permits to record user data efficiently and properly read the recorded user data.

What is claimed is:

1. A data reproducing method for reading data having been written in a data recording area of a recording medium, the data being interleaved with a data linking block appended at each fixed length packet as a recording unit, and linked at a linking position in the data linking block, the method comprising steps of:

reading the data from the data recording area of the recording medium and de-interleaving the data thus read;

detecting the position of the data linking block by checking whether or not the data has been written in units of the fixed length packet by reading identification information and information of the length of the fixed length packet; and generating a reading data by removing the data linking block.

2. The method as set forth in claim 1, wherein it is checked based on data written in the recording medium that the data has been written in units of the fixed length packet.

3. The method as set forth in claim 1, wherein the data linking blocks include at least one run-out block, one link block and at least one run-in block.

4. A data player apparatus for reading data having been written in a data recording area of a recording medium, the data being interleaved with a data linking block appended at each fixed length packet as a recording unit, and linked at a linking position in the data linking block, the apparatus comprising:

means for reading the data from the data recording area of the recording medium;

means for de-interleaving the data read from the data recording area of the recording medium; and means removing the data linking block from the de-interleaved data to generate a reading data;

wherein the reading signal generating means detects the position of the data linking block by checking whether or not the data has been written in units of the fixed length packet by reading identification information and information of the length of the fixed length packet.

5. The apparatus as set forth in claim 4, wherein it is checked based on data written in the recording medium that the data has been written in units of the fixed length packet.

6. The apparatus as set forth in claim 4, wherein the data linking blocks include at least one run-out block, one link block and at least one run-in block.

7. The apparatus as set forth in claim 4, wherein the data linking blocks include one run-out block, one link block and one run-in block.

8. A data recording method for writing data to a data recording area of a recording medium by appending data linking blocks at each unit of data to continuously be written to the data recording area, interleaving the data to which the data linking blocks have been appended and linking the interleaved data at a linking position in the data linking block, the method comprising steps of:

storing one, after the linking position, of the data in the data linking block which will be placed across the linking position due to the interleaving; and linking the interleaved data by appending the stored data to subsequent data;

wherein linking positions of the first data linking blocks are stored in a buffer memory.

9. The method as set forth in claim 8, wherein the data linking blocks include at least one run-out block, one link block and at least one run-in block.

10. A data recorder apparatus for writing data to a data recording area of a recording medium, the apparatus comprising:

means for appending data linking blocks at each unit of data to continuously be written to the data recording area;

means for interleaving the data to which the data linking blocks have been appended; and means for writing the data to the data recording area of the recording medium while linking the interleaved data at a linking position in the data linking block;

wherein the data writing means storing one, after the linking position, of the data in the data linking block which will be placed across the linking position due to the interleaving, and linking the interleaved data by appending the stored data to subsequent data; and wherein linking positions of the first data linking blocks are stored in a buffer memory.

11. The apparatus as set forth in claim 10, wherein the data linking blocks include at least one run-out block, one link block and at least one run-in block.

12. The apparatus as set forth in claim 10, wherein the data linking blocks include one run-out block, one link block and one run-in block.

13. A data recording method for writing data to a data recording area of a recording medium by appending data linking blocks at each unit of data to continuously be written to the data recording area, interleaving the data to which the data linking blocks have been appended and linking the interleaved data at a linking position in the data linking block, the method comprising steps of:

reproducing one, after the linking position, of the data in the data linking block which will be placed across the linking position due to the interleaving; and linking the interleaved data by appending the reproduced data to subsequent data;

wherein linking positions of the first data linking blocks are stored in a buffer memory.

14. The method as set forth in claim 13, wherein the data linking blocks include at least one run-out block, one link block and at least one run-in block.

15. A data recorder apparatus for writing data to a data recording area of a recording medium, the apparatus comprising:

means for appending data linking blocks at each unit of data to continuously be written to the data recording area;

means for interleaving the data to which the data linking blocks have been appended; and means for writing the data to the data recording area of the recording medium while linking the interleaved data at a linking position in the data linking block;

the data writing means reproducing one, after the linking position, of the data in the data linking block which will be placed across the linking position due to the interleaving, and linking the interleaved data by appending the reproduced data to subsequent data;

wherein linking positions of the first data linking blocks are stored in a buffer memory.

16. The apparatus as set forth in claim 15, wherein the data linking blocks include at least one run-out block, one link block and at least one run-in block.

17. The apparatus as set forth in claim 15, wherein the data linking blocks include one run-out block, one link block and one run-in block.

* * * * *